United States Patent [19]

Nakayama et al.

[11] Patent Number: 4,981,190

[45] Date of Patent: Jan. 1, 1991

[54] TORQUE DISTRIBUTION CONTROL SYSTEM FOR A FOUR WHEEL DRIVE VEHICLE

[75] Inventors: Yasunari Nakayama; Mitsuru Nagaoka, both of Hiroshima, Japan

[73] Assignee: Mazda Motor Corporation, Hiroshima, Japan

[21] Appl. No.: 472,048

[22] Filed: Jan. 31, 1990

[30] Foreign Application Priority Data

Jan. 31, 1989 [JP] Japan .................................. 64-21635

[51] Int. Cl.$^5$ ............................................. B60K 17/00
[52] U.S. Cl. .................................... 180/197; 303/110; 364/426.02
[58] Field of Search ........................ 180/197, 233, 249; 303/110, 91; 364/426.02

[56] References Cited

U.S. PATENT DOCUMENTS 4,884,651 12/1989 Harada et al. ...................... 180/197
4,936,404 6/1990 Matsumoto ......................... 180/197

FOREIGN PATENT DOCUMENTS 60429 3/1989 Japan .................................. 180/197

Primary Examiner—Mitchell J. Hill
Attorney, Agent, or Firm—Fish & Richardson

[57] ABSTRACT

In a four wheel drive vehicle adapted to drive all of the four wheels, a braking force is applied to the wheel which causes slipping while the output torque of the engine is increased in accordance with brake operation. A braking pressure adjusting unit is preferably provided with each of the four wheels which is arranged so as to separately and individually brake the wheel which slips.

19 Claims, 11 Drawing Sheets

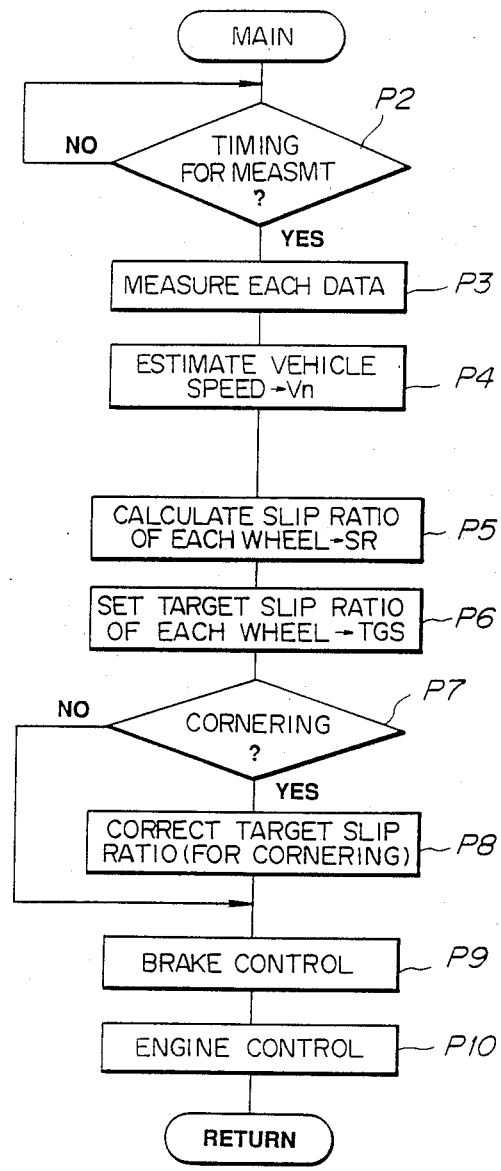

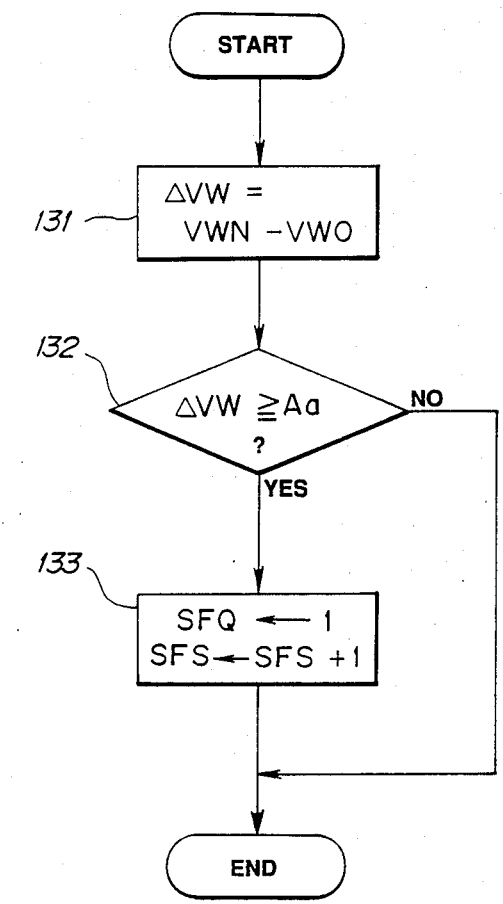

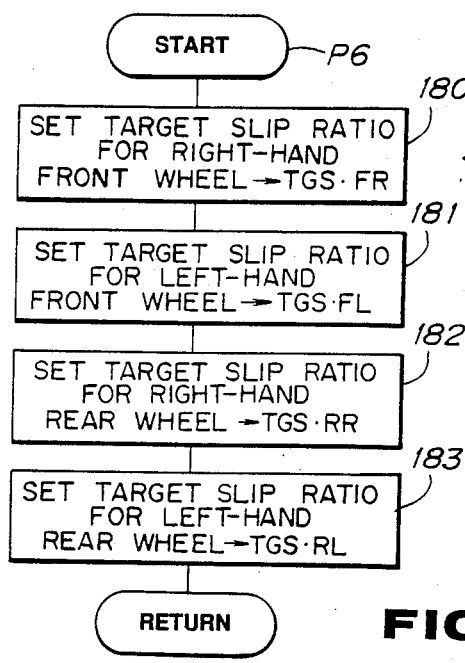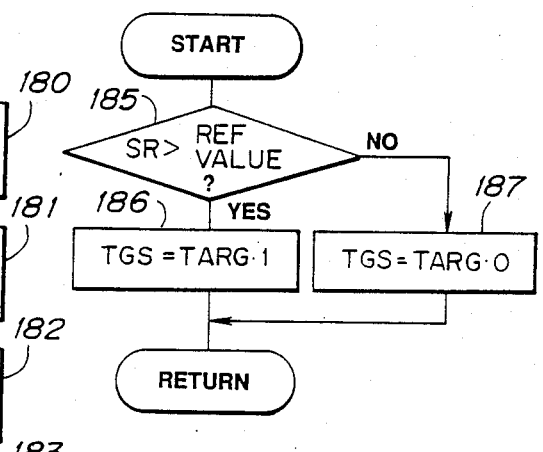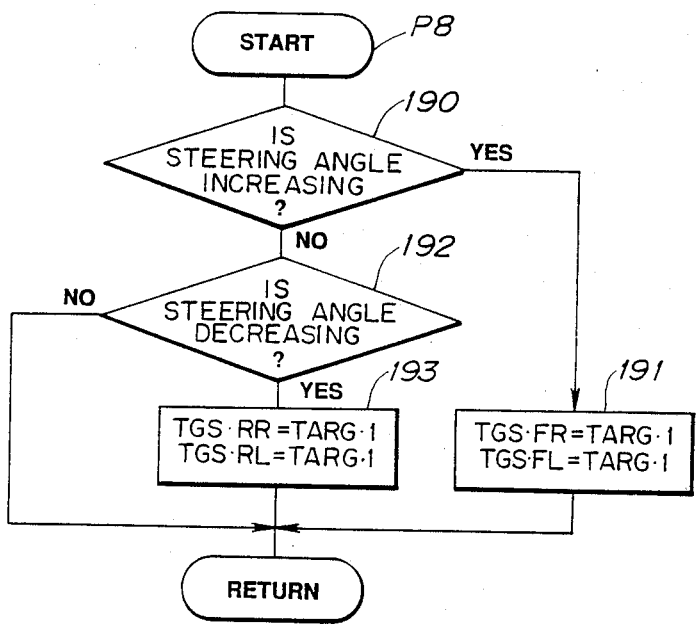

TORQUE DISTRIBUTION CONTROL SYSTEM FOR A FOUR WHEEL DRIVE VEHICLE

BACKGROUND OF THE INVENTION

1. Field of the Invention

The present invention relates to a torque distribution control system for a four wheel drive vehicle.

2. Description of Related Art

For a four wheel drive vehicle adapted to drive all of the four wheels, output torque generated by the engine is distributed to the four wheels and then transmitted to pavement so that it can afford greater tire performance than a two wheel drive vehicle, thereby providing propulsive force more effectively than the two wheel drive vehicle. From this point of view, there is the increasing tendency that the four wheel drive vehicle is adopted for passengers cars and sports cars as well as off-road cars.

For the four wheel drive vehicle, the setting of a torque distribution ratio of each of the wheels exerts a great impact upon vehicle performance. In instances where acceleration is required particularly at the time of starting or accelerating the vehicle, on the one hand, it is desired that the torque distribution ratio of the rear wheels is rendered greater than the ratio of the front wheels because a load applied to the rear wheels is heavier than that to the front wheels. When the vehicle is cornering or is driven straight, the torque distribution ratio of the front wheels is desired to be greater than that of the rear wheels.

Recently, four wheel drive vehicles are on the market, which are provided with a torque distribution adjusting means for altering a torque distribution ratio between the front and rear wheels so as to change the torque distribution ratio of the front wheels to the rear wheels in accordance with various driving states such as starting, straight driving, cornering or the like. Japanese Patent Unexamined Publication (kokai) No. 248,440/1985 discloses technology which involves preventing a drive torque from flowing out from a wheel which causes slipping by braking the slipping wheel. As it is commonplace that the four wheel drive vehicle is provided with a differential gear between each of the wheels, for example, if the left-hand rear wheel slips, there is the problem that all of the output torque of the engine is flown out from the left-hand rear wheel and it is not transmitted at all to the other wheels. The technology as disclosed in the above prior patent publication is to prevent an outflow of the output torque of the engine from the wheel which causes slipping.

Japanese Patent Unexamined Publication (kokai) No. 268,529/1986 discloses a means for judging a wheel which slips. As a matter of course, the four wheel drive vehicle has no undriven wheel so that the vehicle velocity cannot be determined on the basis of the peripheral velocities of the undriven wheels for the four wheel drive vehicle, unlike the two wheel drive vehicle. In the technology disclosed in this prior patent publication an estimated vehicle velocity is determined on the basis of a velocity of each wheel when acceleration of each wheel exceeds a given reference value, and a minimum value is selected from the estimated vehicle velocity and the velocity of each wheel. Then the wheel having its velocity greater than the minimum value is judged as a slipping wheel.

In Japanese Patent Unexamined Publication (kokai) No. 41,245/1988, it is disclosed that technology involves altering a torque distribution ratio of the front wheels to the rear wheels by controlling a friction clutch so as to decrease torque to e transmitted to the wheel that causes slipping due to acceleration of the vehicle, the friction clutch being disposed each to a front propeller shaft for transmitting the output torque of the engine to the front wheels and to a rear propeller shaft for transmitting the output torque thereof to the rear wheels. The technology disclosed in this prior patent publication, however, presents the problem that responsiveness to convergence of a slip may be impaired because the friction clutch disposed at each of the propeller shafts is controlled in order to prevent a slip of the wheel. If one of the wheels slips, operation of the brake disposed at the slipping wheel is most effective to converge the slip and is best in responsiveness to slip convergence. As long as the responsiveness to slip convergence is concerned, the technology as disclosed in Japanese Patent Unexamined Publication (kokai) No. 248,440/1985 is better. This technology, however, braking causes a loss of energy on the other hand. In other words, braking may radiate a portion of its drive torque as a heat energy, thus causing the problem that a drive power cannot be provided as required by the driver.

SUMMARY OF THE INVENTION

Therefore, the present invention has the object to provide a torque distribution control system for a four wheel drive vehicle adapted to accomplish satisfactory convergence of a slip and drivability of the vehicle.

In order to achieve the object, the present system consists of a torque distribution control apparatus for a four wheel drive vehicle comprising:

a brake means disposed at each of four wheels independently and separately from each other;

a braking pressure adjusting means disposed at each of two groups of the wheels;

a slip value detecting means for detecting a slip value of each wheel with respect to pavement;

a slipping-wheel judging means for judging a slipping wheel which slips in an actual slip value greater than a given target slip value by comparing the actual slip value detected by said slip value detecting means with the target slip value;

a brake control means for operating said brake means against the group of the wheels containing the slipping wheel when the slipping wheel detected by said slipping-wheel judging means is contained only one of the two groups of the wheels; and an engine control means for operating an engine to increase its output torque in accordance with operation of said brake means when said brake control means is operated.

Setting of two group of the wheels is feasible. For example, the wheels can be set to form the left-hand and right-hand front wheels in one group and the left-hand and right-hand rear wheels in the other. Thus, the torque distribution ratio to the one group to the other may be changed. With the time of cornerning taken into account, it is also possible to form the left-hand front and rear wheels in one group and the right-hand front and rear wheels in the other group and to change the torque distribution ratio of the one group to the other. It may further be feasible to form the wheels in the diagonal positions in two groups, as seen in a brake piping system.

It is further preferred that the torque distribution ratio of each one wheel to another wheel is altered. In this case, the preferred construction of the torque distribution control system for the four wheel drive comprises:

a brake means disposed at each of four wheels independently and separately from each other;

a braking pressure adjusting means disposed at each of the four wheels;

a slip value detecting means for detecting a slip value of each wheel with respect to pavement;

a slipping-wheel judging means for judging a slipping wheel which slips in an actual slip value greater than a given target slip value by comparing the actual slip value detected by said slip value detecting means with the target slip value;

a brake control means for operating said brake means against the slipping wheel detected by said slipping-wheel judging means; and an engine control means for operating an engine to increase its outPut torque in accordance with operation of said brake means when said brake control means is operated.

The main advantage of the foregoing construction of the torque distribution control system for the four wheel drive vehicle resides in the fact that there can be constructed a torque distribution ratio adjusting means for distribution torque to each of the individual wheels can be arranged, using the existing brakes and engine. More specifically, torque is decreased by braking the wheel which slips while the torque decreased by braking is compensated by increasing the output torque generated by the engine and transmitted to the other wheel or wheels. Other advantages reside in that this construction ensures a prevention of a slip value of the slipping wheel from becoming greater any more and can offer the effect which is known as a so-called traction control.

It is to be noted that the target slip value to be used for judgment of slipping wheels may be altered in accordance with a driving state of the vehicle. When the actual slip value of each wheel with respect to pavement or a road surface is greater than the target slip value, the wheel concerned is judged as a slipping wheel, and it is noted in this case that tire performance of the slipping wheel has already reached its limit and this tire performance varies with the driving state of the vehicle.

More specifically, the tire performance is meant to contain a so-called grip force for producing a propulsive force in the longitudinal direction of the vehicle and a transverse force for resisting in the transverse direction. The greater the grip force the greater a slip ratio of the wheel with respect to pavement or a road surface; however, once the grip force amounts to its peak or maximum point, it is thereafter decreased as the slip ratio increases. On the other hand, the transverse acceleration gets smaller as the grip force gets greater. On the contrary, an actual slip value may vary with a state of pavement, particularly with a friction coefficient, a periodical variation of the tires, and so on, even if the driving state of the vehicle is the same.

Other objects, advantages and features of the present invention will become apparent in the course of the description which follows, with reference to the accompanying drawings.

BRIEF DESCRIPTION OF THE DRAWINGS

FIGS. 2-8B are flowcharts showing examples of control in accordance with the present invention.

DESCRIPTION OF THE PREFERRED EMBODIMENTS

Figure 1:
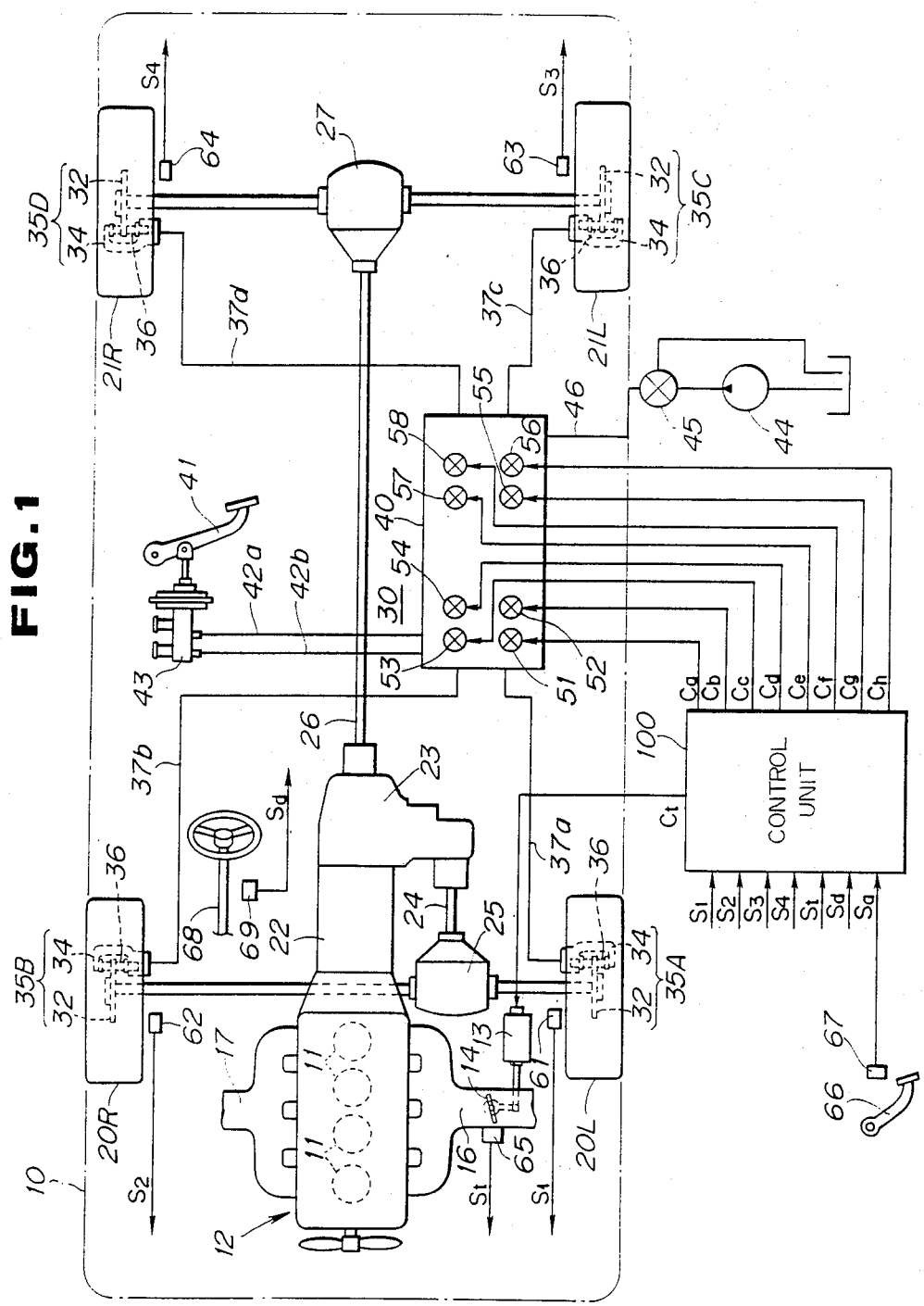
FIG. 1 represents the basic arrangement of the torque distribution control system in accordance with the present invention.

The present invention will be described in more detail by way of example with reference to the accompanying drawings. In the following description and the accompanying drawings, reference symbols "F" and "R" provided with reference numerals as suffixes denote "front" or "forward" and "rear" or "rearward", respectively and reference symbols "L" and "R" provided with the reference symbols "F" and "R" denote "left-hand" or "left" and "right-hand" or "right", respectively. Thus, reference symbols "FL", "FR", "RL", and "RR" denote left-hand front, right-hand front, left-hand rear, and right-hand rear, respectively.

It is to be noted that, in the embodiments as shown in the accompanying drawings, a ratio of torque distribution can be changed independently for each of all four wheels by means of the brake and the engine in a vehicle which is constructed to transmit torque from the engine to the left-hand and right-hand front and rear wheels.

Overall Construction

As shown in FIG. 1, a vehicle body 10 of the automobile of a four-wheel driven type is provided at its forward portion with an engine 12 which has for example four cylinders 11. Each of the cylinders 11 is fed with a mixed fuel consisting of air and fuel to be supplied from a fuel supply system through an air intake passage 16 which, in turn, is provided with a throttle valve 14 to be driven to open or close by a throttle actuator 13. The mixture supplied into the cylinders 11 is combusted by an ignition system and then discharged into an exhaust passage 17. Combustion of the mixture rotates the engine 12, and torque generated is transmitted to the left-hand and right-hand front wheels 20L and 20R respectively, through a torque transmission pathway consisting of a transmission 22, a center differential mechanism 23, a propeller shaft 24 for the front wheels and a front-wheel differential mechanism 25 while the torque is transmitted to the left-hand and right-hand rear wheels 21L and 21R, respectively, through a torque transmission pathway consisting of the transmission 22, the center differential mechanism 23, a propeller shaft 26 for the rear wheels and a rear-wheel differential mechanism 27.

A brake control unit 30 is provided in association with the left-hand and right-hand front wheels 20L and 20R and the left-hand and right-hand rear wheels 21L and 21R, respectively. The brake control unit 30 contains disk brakes 35A, 35B, 35C and 35D, each of which comprises a disk 32, disposed to the respective left-hand and right-hand front wheels 20L and 20R as well as left-hand and right-hand rear wheels 21L and 21R, and a caliper 34 with a brake pad provided thereon to press the disk 32. The caliper 34 is provided with a wheel cylinder 36 which, in turn, is connected to a liquid-pressure adjusting unit 40 through a conduit 37a, 37b, 37c or 37d for the respective front wheels 20L, 20R and rear wheels 21L, 21R. As a braking liquid pressure is supplied to the wheel cylinder 36 from the liquid-pressure adjusting unit 40 through the respective conduits 37a-37d, the caliper 34 causes the brake pad to press the disk 32 by means of a pressing force proportional to the braking liquid pressure, thereby braking the left-hand and right-hand front wheels 20L and 20R as well as the left-hand and right-hand wheels 21L and 21R, respectively.

To the liquid pressure adjusting unit 40 is supplied a liquid pressure, in proportion to manipulation by stepping a brake pedal 41 down, through conduits 42a and 42b from a power cylinder 43 disposed in accompany with the brake pedal 41. To the liquid pressure adjusting unit 40 is further supplied an operating liquid pressure through a pump 44 and a pressure governing valve 45 through a conduit 46. The liquid-pressure adjusting unit 40 forms a braking liquid pressure in proportion to a stepping manipulation of the brake pedal 41 and supplies the disk brakes 35A, 35B, 35C and 35D through conduits 37a, 37b, 37c and 37d, respectively, during braking operation under ordinary braking conditions. During slip control, however, the braking liquid pressure is formed separately for each of the disk brakes 35A-35D in accordance with operation of electromagnetically-operable shift valves 51-58 and supplied selectively to the disk brakes 35A-35D.

The shift valves 51-58 are arranged in pairs of shift valves 51, 52; 53, 54; 55, 56; and 57, 58. The shift valves 51 and 52 are for controlling the braking liquid pressure for the disk brake 35A, the shift valves 53 and 54 for controlling the braking liquid pressure for the disk brake 35B, the shift valves 55 and 56 for controlling the braking liquid pressure for the disk brake 35C, and the shift valves 57 and 58 for controlling the braking liquid pressure for the disk brake 35D. When one of the shift valves in each pair, namely, the shift valves 51, 53, 55 and 57, is opened while the other, namely, the shift valves 52, 54, 56 and 58, is closed, the braking liquid pressure to be supplied to the respective disk brakes 35A-35D is increased. On the contrary, when one of the shift valves, or the shift valves 51, 53, 55 and 57, is closed while the other, or the shift valves 52, 54, 56 and 58, is opened, the braking liquid pressure to be supplied thereto is decreased. Further, when all the shift valves 51-58 are closed, the braking liquid pressure to be supplied thereto is retained in such a state as it is.

In order to control operation of opening or closing the shift valves 51 to 58 and to control operation of the throttle actuator 13 there is additionally disposed a control unit 100 to which were supplied signals as follows: signal S1 corresponding to a peripheral velocity of the left-hand front wheel 20L sensed and generated by a velocity sensor 61 disposed in association with the left-hand front wheel 20L; signal S2 corresponding to a peripheral velocity of the right-hand front wheel 20R sensed and outputted by a velocity sensor 62 disposed in association therewith; signal S3 corresponding to a peripheral velocity of the left-hand rear wheel 21L sensed and generated by a velocity sensor 63 disposed in association with therewith: signal S4 corresponding to a peripheral velocity of the right-hand rear wheel 21R sensed and outputted by a velocity sensor 64 disposed in association therewith; signal St corresponding to a throttle opening angle sensed by and generated from a throttle-opening-angle sensor 65 disposed in association with the throttle valve 14; signal Sa corresponding to an amount manipulated by stepping the accelerator pedal 66 down, sensed and generated by an accelerator-opening-angle sensor 67 disposed in association with the accelerator pedal 66; and signal Sd corresponding to a steering angle of the left-hand and right-hand front wheels 20L and 20R, respectively, sensed by and outputted ±rom a steering-angle sensor 69 disposed in association with the steering wheel 68.

Outline of Control

The content of control by means of the control unit will be described with a main routine of the flow chart as shown in FIG. 2.

First at step P2, it is judged whether it is timing for measurement and, at step P3, when it is decided that it is the timing for measurement, the flow proceeds to step P3 at which the signals inputted from the various sensors as described hereinabove are measured. Then at step P4, a vehicle velocity, namely, a velocity of the vehicle body relative to pavement, is estimated and this estimated vehicle velocity is represented by signal "Vn".

At step P5 an actual slip value SR for each of the wheels is calculated on the basis of the estimated vehicle velocity Vn and the peripheral velocity of each of the wheels. In this embodiment, it is to be noted that the slip value SR is given as a slip ratio as calculated by the following equation:

$$SR = (Vw - Vn)/Vw$$

It is also noted that the slip value may be represented by a slip amount that can be defined, for example, as $$Vw - Vn$$

Figure 10:
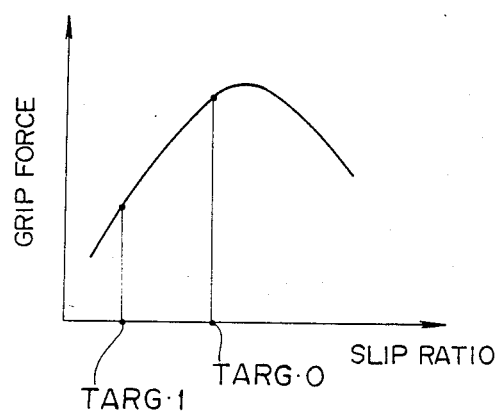

At step P6, a target slip ratio TGS is set for each of the wheels. As the target slip ratio TGS in this embodiment, there are given two target slip ratios: TARG·0 and TARG·1, as shown in FIG. 10, and each of the wheels is set to attain either of the target slip ratios. Referring to FIG. 10, it is seen that the target slip ratio TARG·0 is set to give a magnitude of a grip force, which amounts to an approximation to its upper limit while the target slip ratio TARG·1 is set to give a magnitude thereof, which is approximated to zero of the grip force. More specifically, it is thus said that the wheel set in the target slip ratio TARG·0 is set with greater weight attached to the grip force than to the transverse acceleration (G). while the wheel set in the target slip ratio TARG·1 is set to the contrary, in other words, with greater weight placed upon the transverse acceleration than upon the grip force.

Then at step P7, it is judged whether or not the vehicle is cornering. When it is decided at step P8 that the vehicle is cornering, then the flow proceeds to step P8 where the target slip ratio TGS set at step P6 is corrected so as to be suitable for cornering.

At step P9, the wheel is braked which gives the actual slip ratio greater than the target slip ratio TARG·1. And the sum of the braking fOrCe applied to all the wheels is determined.

Further at step P10, engine control is implemented by increasing torque generated by the engine 12 in order to compensate the torque decreased due to the brake operation at step P9.

Detail of Control

Steps P4, P6 and P8–P10 will be described in more detail with reference to the accompanying drawings, while more description of steps P2, P3 and P5 will be omitted because the above description thereon seems to be self-explanatory.

a. Estimation of Vehicle Speed (Step P4 of FIG. 2; FIGS. 3A–3B & 4A–4B)

In estimating the vehicle velocity Vn, the way of calculating it varies with the state in which the vehicle is driven at high speed, it is driven straight at low speed, and it is cornering at low speed. Further, when the vehicle is cornering at low speed, it is judged whether or not each of the wheels slips on the basis of peripheral acceleration of the corresponding wheels 20L, 20R, 21L and 21R so that the procedure of estimating the vehicle velocity Vn is changed by the number of the wheels which are decided as slipping.

When the vehicle is driven at high speed, an estimated vehicle velocity $V_{n-1}$ (where n is a positive integer) is given as being equal to or greater than a given value Vh, the estimated vehicle velocity $V_{n-1}$ being calculated on the basis of the peripheral velocities of the left-hand and right-hand front wheels 20L, 20R and left-hand and right-hand rear wheels 21L, 21R, represented by the signals S1, S2, S3, and S4, respectively, which are inputted one cycle ago. When the vehicle is driven straight at low speed, the estimated vehicle velocity $V_{n-1}$ calculated in the same manner as above is smaller than the given value Vh, and a steering angle of the left-hand and right-hand front wheels 20L and 20R is given as smaller than a predetermined value $\theta a$. At the time when the vehicle is driven at high speed or it is driven straight at low speed, on the one hand, the estimated vehicle velocity Vn at that time is calculated by multiplying the smallest of the peripheral velocities of the respective left-hand and right-hand, front and rear wheels 20L, 20R, 21L and 21R by a given correction coefficient $\alpha_0$ (<1).

At the time when the vehicle is cornering at low speed, wherein the estimated vehicle velocity $V_{n-1}$ is smaller than the given value Vh and the steering angle of the left-hand and right-hand front wheels 20L and 20R is equal to or greater than the predetermined value $\theta a$, on the other hand, the estimated vehicle velocity Vn is set in a different manner, on the basis of the peripheral velocity of the wheel or wheels which is or are judged as not slipping in an amount larger than a given value with respect to pavement, in accordance with the location and the number of the wheel or wheels which is or are sensed as not slipping (hereinafter sometimes will be referred to as non-slipping wheel or wheels).

In setting the estimated vehicle velocity during driving operation while the vehicle is cornering at low speed, when none of the wheels are sensed as slipping or when it is sensed that only one of the wheels is slipping, the estimated vehicle velocity Vn may be calculated differently in the following manner. If the vehicle is sensed as cornering to the left on the basis of the steering wheel of the left-hand and right-hand front wheels 20L and 20R, on the one hand, the estimated vehicle velocity Vn is calculated by multiplying a mean value of the peripheral velocities of the left-hand front wheel 20L and the right-hand rear wheel 21R by a predetermined correction coefficient $\alpha_1$ when both of the left-hand front wheel 20L and the right-hand front wheel 20R are the non-slipping wheels. If the vehicle is sensed as cornering to the left when either of the left-hand front wheel 20L or the right-hand rear wheel 21R is sensed as slipping, on the other hand, the estimated vehicle velocity Vn is calculated by multiplying a mean value of the peripheral velocities of the non-slipping right-hand front wheel 20R and the left-hand rear wheel 21L by the given correction coefficient $\alpha_1$.

In condition that none of the wheels are or only one of them is sensed as slipping, if none of the right-hand front wheel 20R and the left-hand rear wheel 21L are the non-slipping wheels when the vehicle is sensed to be cornering to the right, on the one hand, the estimated vehicle velocity Vn is calculated by multiplying a mean value of the peripheral velocities of the right-hand front wheel 20R and the left-hand rear wheel 21L by the given correction coefficient $\alpha_1$. If either of the right-hand front wheel 20R or the left-hand rear wheel 21L is sensed as slipping when the vehicle is sensed as cornering to the right, on the other hand, the estimated vehicle velocity Vn is calculated by multiplying a mean value of the peripheral velocities of the non-slipping left-hand front wheel 20L and the right-hand rear wheel 21R by the given correction coefficient $\alpha_1$.

When two of the wheels are sensed as slipping wheels, the estimated vehicle velocity Vn is calculated by multiplying a mean value of the non-slipping front wheels or a mean value of the non-slipping rear wheels by a given correction coefficient $\alpha_2$. More specifically, when the left-hand and right-hand front wheels 20L and 20R are sensed as not slipping, on the one hand, then the mean value of the peripheral velocities of these non-slipping wheels is given and then multiplied by the given correction coefficient $\alpha_2$ to thereby calculate the estimated vehicle velocity Vn. If the left-hand and right-hand rear wheels 21L and 21R are sensed as not slipping, on the other, the estimated vehicle velocity Vn is calculated by multiplying a mean value of the peripheral velocities of the non-slipping rear wheels 21L and 20R by the correction coefficient $\alpha_2$. If the left-hand front and rear wheels 20L and 21L are sensed as non-slipping wheels or if the right-hand front and rear wheels 20R and 21R are sensed as non-slipping wheels, then the estimated vehicle velocity Vn is calculated by multiplying the peripheral velocity of the non-slipping wheel by the given correction coefficient $\alpha_2$, whose wheel gives the local closer to the center of gravity than the other non-slipping wheel. More specifically, when the non-slipping wheels are the left-hand front and rear wheels 20L and 21L while the vehicle is cornering to the right, on the one hand, the peripheral velocity of the left-hand front wheel 20L is multiplied by the correction coefficient $\alpha_2$, while, if the vehicle is cornering to the left, on the other hand, the peripheral velocity of the left-hand rear wheel 21L is multiplied by the correction coefficient $\alpha_2$, thereby giving the estimated vehicle velocity Vn. When the right-hand front wheel 20S and the right-hand rear wheel 21R are sensed as non-slipping wheels, the peripheral velocity of the right-hand front wheel 20R is multiplied by the correction coefficient $\alpha_2$ if the vehicle is cornering to the right, while the peripheral velocity of the right-hand rear wheel 21R is multiplied by the correction coefficient $\alpha_2$ if the vehicle is cornering to the left, whereby the estimated vehicle velocity Vn is given in each case.

When the non-slipping wheels are the left-hand front wheel 20L and the right-hand rear wheels 21R or when the right-hand front wheel 20R and the left-hand rear wheel 21L are sensed as non-slipping wheels, the estimated vehicle velocity Vn is calculated multiplying a mean value of the peripheral velocities of the two non-slipping wheels, namely, the left-hand front wheel 20L and the right-hand front wheel 20R and the left-hand rear wheel 21L are sensed as non-slipping wheels, the estimated vehicle velocity Vn is calculated by multiplying a mean value of the peripheral velocities of the two non-slipping wheels, namely, the left-hand front wheel 20L and the right-hand rear wheel 21R or the right-hand front wheel 20R and the left-hand rear wheel 21L, by the correction coefficient $\alpha_2$.

When three of all the four wheels are sensed as slipping, the estimated vehicle velocity Vn is calculated by multiplying the peripheral velocity of the non-slipping wheel by a given correction coefficient $\alpha_3$.

If all of the four wheels are sensed as slipping, the estimated vehicle velocity Vn calculated immediately before all the four wheels were sensed as slipping wheels is regarded as the estimated vehicle velocity Vn at this time.

In calculating the estimated vehicle velocity Vn, it is preferred that the correction coefficients $\alpha_1$, $\alpha_2$ and $\alpha_3$ are set to be given as follows: $1 > \alpha_1 > \alpha_2 > \alpha_3$, with the fact taken into account that the vehicle becomes unsabler as the number of the slipping wheels gets greater.

By setting the estimated vehicle velocity in the different manner is accordance with the location and the number of the slipping wheel or wheels, as described hereinabove, the estimated vehicle velocity Vn can be set without departing from the actual vehicle velocity to a greater extent. The present invention is further advantageous because it can use a comparatively simple construction, with the actual driving state taken into account, yet without sue of any expensive ground speed sensor.

The content of the process P4 of FIG. 2 will be described more in detail with reference to the flow charts as shown in FIGS. 3A–3B and 4A–4B.

Figure 3A:
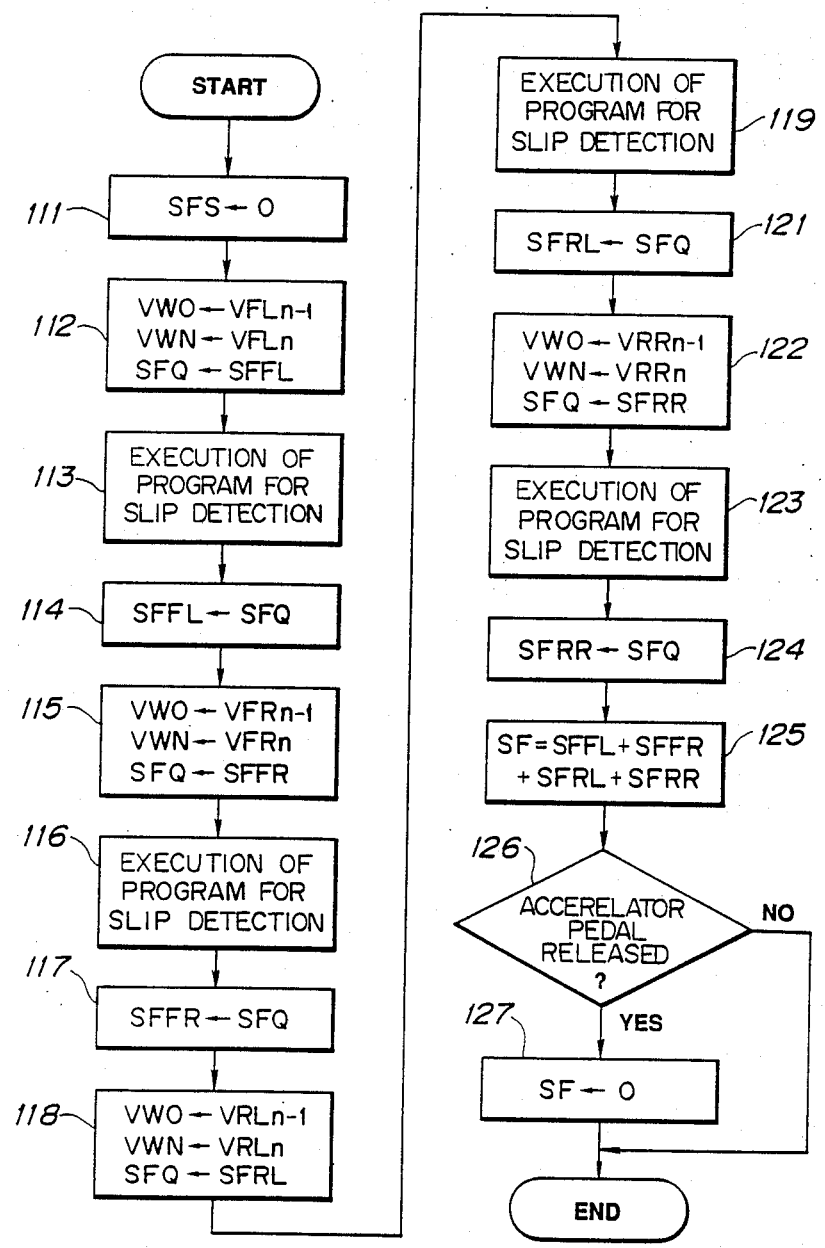

As shown in FIG. 3A, after the system was started, concurrent slip coefficient flag SFS is set to "0" at step 111. Then at step 112, the peripheral velocity value of the left-hand front wheel 20L of one cycle ago, $VFL_{n-1}$, is given as VWO, the peripheral velocity value of the left-hand front wheel 20L in this case, VFLn, is given as peripheral velocity value VWN, and left-hand front-wheel slip flag SFFL is given as a slipping-wheel judgment flag SFQ. At step 113, a program for detecting a slip is executed by flow chart as shown in FIG. 3B.

Referring now to FIG. 3B, after the system has been started, the peripheral velocity value VWO is subtracted from VWN at step 131, thereby given peripheral acceleration value $\Delta$VW. Then at step 132, it is judged whether or not the peripheral acceleration value $\Delta$VW is equal to or greater than a value Aa. When the peripheral acceleration value is decided there to be equal to or greater than the value Aa, on the one hand, the flow proceeds to sept 133 where the slipping-wheel judgment flag SFQ is set to "1" as it is decided that a slip has occurred to a degree greater than a given value. Concurrently with this setting, a new concurrent slip coefficient flag SFS is set by adding "1" to the current slip coefficient flag SFS. Then this program ends. If it is decided at step 132 that the peripheral acceleration value $\Delta$VW is smaller than the value Aa, on the other hand, the program ends without passing through step 133. After the program of FIG. 3B has ended, the flow proceeds to step 114 and the left-hand front-wheel slip flag SFFL is replaced by the slipping-wheel judgment flag SFQ. Then the flow advances to step 115.

At step 115, the peripheral velocity value of the right-hand front wheel 20R of one cycle ago, $VFR_{n-1}$, is set to value VWO while the peripheral velocity value in this case, VFRn, is set to value VWN, and a right-hand front-wheel slip flage SFFR is given as the slipping-wheel judgment flag SFQ. Then at step 116, the program for slip detection is executed in the same manner as shown in FIG. 3B and, at step 117, the right-hand front-wheel judgment flag SFFR is replaced by the slipping-wheel judgment flage SFQ. The flow then proceeds to step 118 where the peripheral velocity value of the left-hand rear wheel 21L of one cycle ago, $VRL_{n-1}$, is set to value VWO, the peripheral velocity value of the left-hand rear wheel 21L at that time, VRLn, is set to value VWN, and the slipping-wheel judgment flag SFQ is set to the rear-wheel slip flag SFRL. Then at step 119, the program for slip detection as shown by the flow chart in FIG. 3B is executed, followed by substitution of the slipping-wheel judgment flag SFQ for the left-hand rear-wheel slip flag SFRL at step 121.

After the flow proceeds to step 122, the peripheral velocity value of the right-hand rear wheel 21R of one cycle ago, $VRR_{n-1}$, is set to value VWO, the peripheral velocity value thereof in this case, VRRn, is set to value VWN, and the slipping-wheel judgment flag SFQ is set to a right-hand rear-wheel slip flag SFRR. Then at step 123, the program is executed in the same manner as shown in FIG. 3B and, at step 124, the right-hand rear-wheel slip flag SFRR is replaced by the slipping-wheel judgment flag SFQ. Then the flow proceeds to step 125.

At step 125, all the left-hand front-wheel slip flag SFFL, the right-hand front-wheel slip flag SFFR, the left-hand rear-wheel slip flag SFRL, and the right-hand rear-wheel slip flag SFRR are added to thereby set a slipping-wheel coefficient flag SF. Then at step 126, it is judged whether or not the accelerator pedal 66 is open. When the accelerator pedal 66 is decided to be open, then the flow advances to step 127 where the slipping-wheel coefficient flag SF is set to zero and the program ends. If it is decided at step 126 that the accelerator pedal 66 is not open, then the program ends without passage through step 127.

Figure 4A:
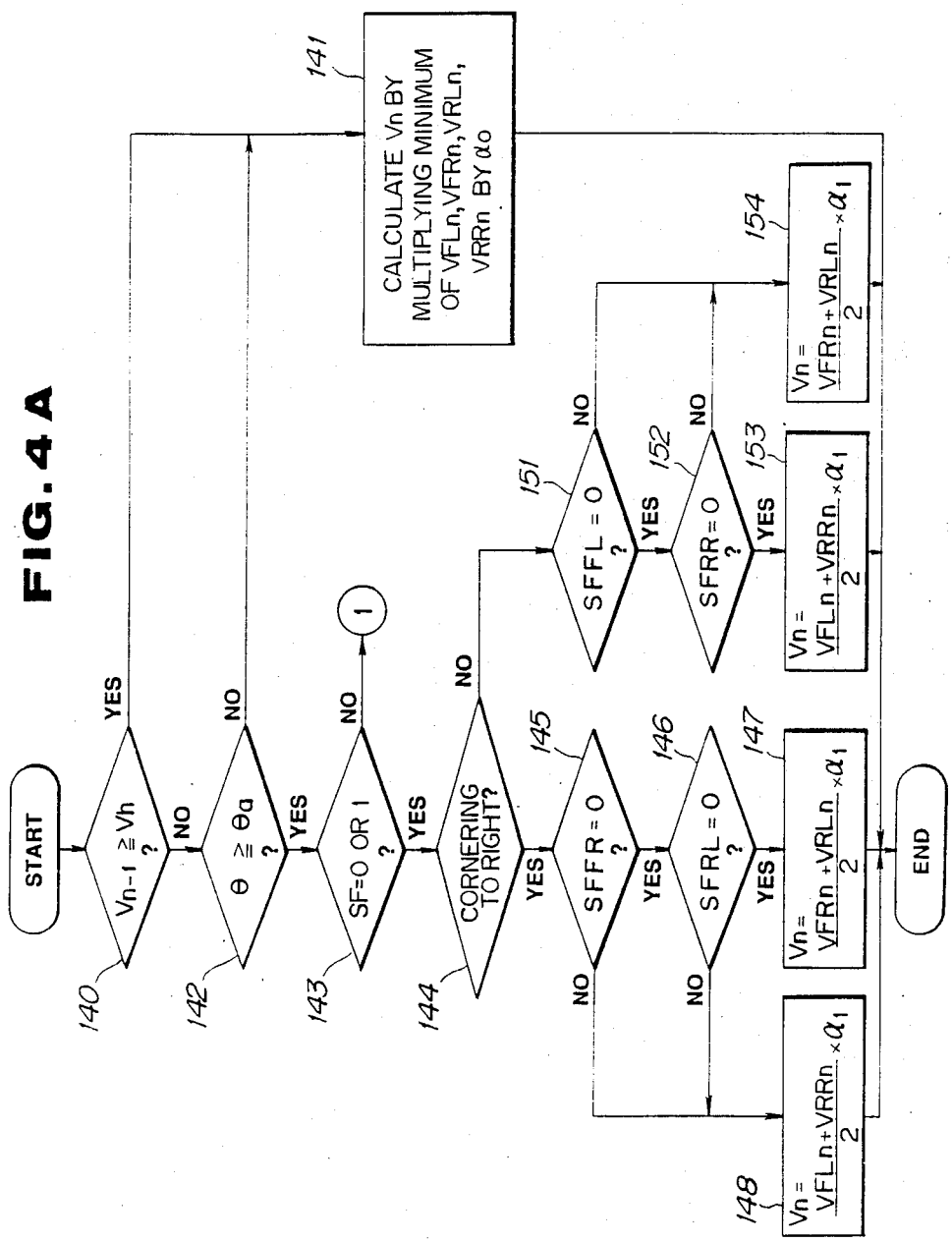
Figure 4B:
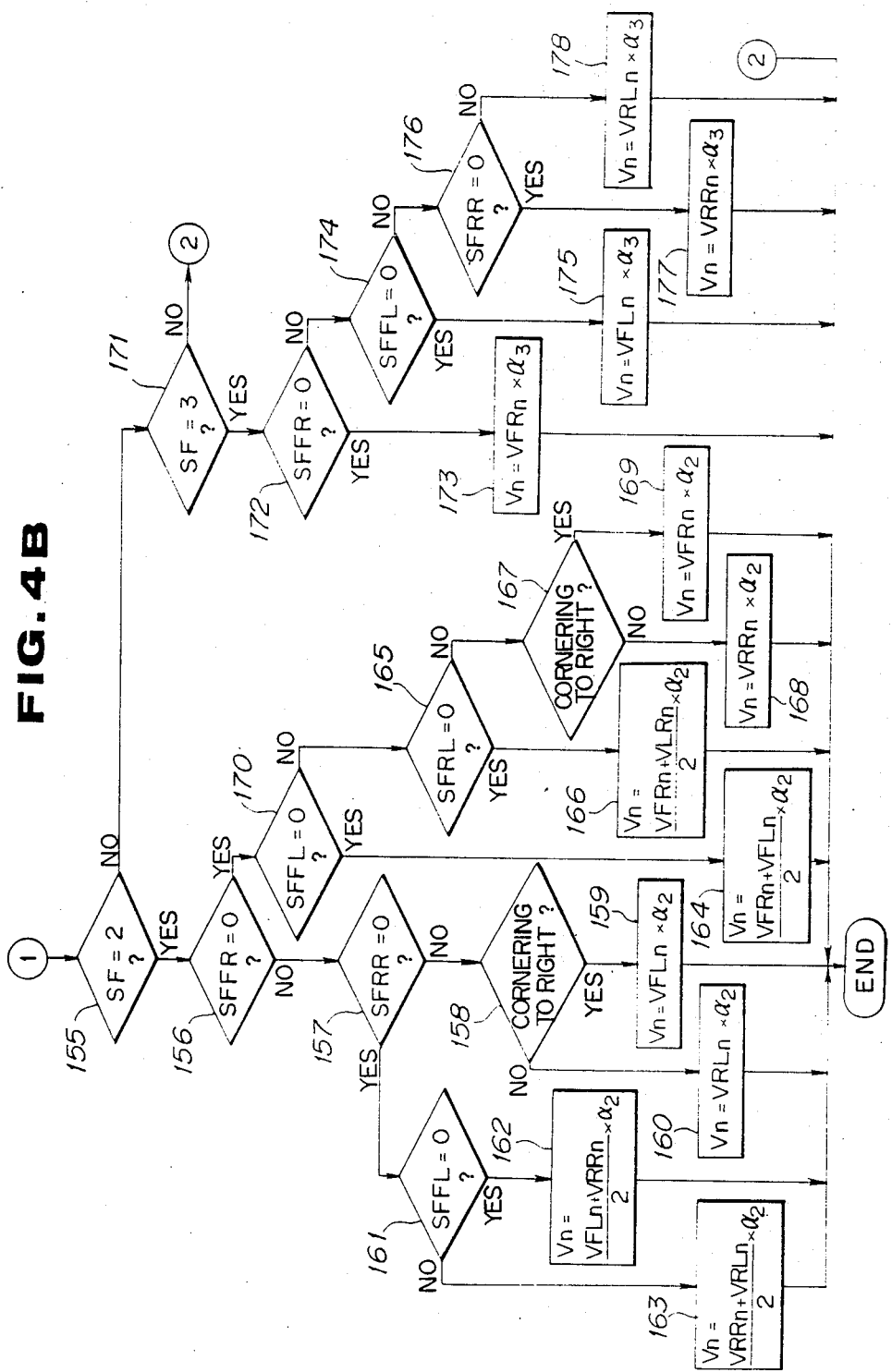

Referring to the flow charts as shown in FIGS. 4A and 4B, it is decided at step 140 whether or not the estimated vehicle velocity set one cycle ago, $V_{n-1}$, is equal to or greater than value Vh. When it is decided that the estimated vehicle velocity $V_{n-1}$ is equal to or greater than the value Vh, the flow advances to step 141 and the estimated velocity value, Vn, is calculated by multiplying the minimum value of the peripheral velocity values VFLn, VFRn, VRLn and VRRn of the left-hand and right-hand front wheels 20L, 20R and the left-hand and right-hand rear wheels 21L, 21R, respectively, by a correction coefficient $\alpha_0$, the peripheral velocity values being represented by the signals S1–S4. Then the program ends. When it is decided at step 140 that the estimated vehicle velocity value $V_{n-1}$ is smaller than the value Vh, the flow proceeds to step 142 where it is judged whether or not the steering angle $\theta$ for the left-hand and right-hand front wheels 20L and 20R, respectively, as indicated by the signal Sd, is equal to or greater than value $\theta$a. When it is decided that the steering angle $\theta$ is smaller than the value $\theta$a, on the one hand, the flow advances to step 141 where the estimated vehicle velocity value Vn is calculated in the same manner as described hereinabove and the program ends. When it is decided at step 142 that the steering angle $\theta$ is equal to or greater than the value $\theta a$, on the other hand, the flow proceeds to step 143.

At step 143, it is judged whether or not the slipping-wheel coefficient flag SF is set to 1 or 0.

Referring now to the flow charts as shown in FIGS. 4A and 4B, it is judged at step 140 whether or not the estimated vehicle velocity set one cycle ago, $V_{n-1}$, is equal to or greater than value Vh. When it is judged that the estimated vehicle velocity $V_{n-1}$ is equal to or greater than the value Vh, the flow advances to step 141 and the estimated velocity value, Vn, is calculated by multiplying the minimum value of the peripheral velocity values VFLn, VFRn, VRLn and VRRn of the left-hand and right-hand front wheels 20L, 20R and the left-hand and right-hand rear wheels 21L, 21R, respectively, by a correction coefficient $\alpha_0$, the peripheral velocity values being represented by the signals S1–S4. Then the program ends. When it is decided at step 140 that the estimated vehicle velocity value $V_{n-1}$ is smaller than the value Vh, the flow proceeds to step 142 where it is judged whether or not the steering angle $\theta$ for the left-hand and right-hand front wheels 20L and 20R, respectively, as indicated by the signal Sd, is equal to or greater than value $\theta a$. When it is decided that the steering angle $\theta$ is smaller than the value $\theta a$, on the one hand, the flow advances to step 141 where the estimated vehicle velocity value Vn is calculated in the same manner as described hereinabove and the program ends. When the decision is made at step 142 that the steering angle $\theta$ is equal to or greater than the value $\theta a$, on the other hand, the flow proceeds to step 143.

At step 143, it is judged whether or not the slipping-wheel coefficient flag SF is set to 1 or 0. When it is judged that the slipping-wheel coefficient flag SF is set to 1 or 0, it is further judged at step 144 whether the vehicle is cornering to right on the basis of the steering angle $\theta$ or not. When it is decided at step 144 that the vehicle is cornering to the right, on the one hand, then whether or not the right-hand front-wheel slip flag SFFR is set to zero is judged at step 145. When the flag SFFR is decided to be set to zero, the flow advances to step 146 where it is further judged whether or not the left-hand rear-wheel slip flag SFRL is set to zero. If the flag SFRL is also decided to be zero, then at step 147, the estimated vehicle velocity value Vn is calculated by the following formula:

$$Vn = \frac{VFRn + VRLn}{2} \times \alpha_1$$

Then the program ends. On the other hand, when the flag SFFR is not set to zero at step 145 and the flag SFRL is not set to zero at step 146, the estimated vehicle velocity value Vn is calculated at step 148 by the following formula:

$$Vn = \frac{VFLn + VRRn}{2} \times \alpha_1$$

Then the program ends.

At step 144, when it is decided that the vehicle is not cornering to the right, on the other hand, it is then judged at step 151 whether or not the left-hand front-wheel slip flag SFFL is set to zero. When the decision is made to the effect that the left-hand front-wheel slip flag SFFL is set to zero, then the flow proceeds to step 152 where it is further judged whether or not the right-hand rear-wheel slip flag SFRR is set to zero. When it is decided at step 152 that the flag SFRR is set to zero, then at step 153, the estimated vehicle velocity value Vn is calculated by the following equation:

$$Vn = \frac{VFLn + VRRn}{2} \times \alpha_1$$

Then the program ends. If the judgment at step 151 and 152 is NO, then the flow advances to step 154 and the estimated vehicle velocity value Vn is calculated by the following equation:

$$Vn = \frac{VFRn + VRLn}{2} \times \alpha_1$$

Referring back to step 143, when it is decided that the slipping-wheel coefficient flag SF is not set to zero or 1, then the flow advances to step 155 (FIG. 4B)

As shown in FIG. 4B, it is judged at step 155 whether or not the slipping-wheel coefficient flag SF is set to 2. When the decision is made such that the flag SF is set to 2, it is then judged at step 156 whether the right-hand front-wheel slip flag SFFR is set to zero. If it is decided that the flag SFFR is not set to zero, it is further judged at step 157 whether or not the right hand rear-wheel slip flag SFRR is set to zero. At step 157, it is judged that the flag SFRR is not set to zero, the flow then advances to step 158 where it is judged whether or not the vehicle is cornering to right. If the decision at step 158 is YES, on the one hand, the estimated vehicle velocity value Vn is calculated at step 159 by the following equation:

$$Vn = VFLn \times \alpha_2$$

Then the program ends. If it is judged at step 158 that the vehicle is not cornering to the right, then at step 160, the estimated vehicle velocity value Vn is calculated by the following equation:

$$Vn = VRLn \times \alpha_2$$

Then the program ends.

At step 157, on the other hand, when it is decided that the right-hand rear-wheel slip flag SFRR is set to zero, then the flow advances to step 161 where it is judged whether or not the left-hand front-wheel slip flag SFFL is set to zero. If YES, then the estimated vehicle velocity value Vn is calculated at step 162 by the following equation:

$$Vn = \frac{VFLn + VRRn}{2} \times \alpha_2$$

Then the program ends. If NO at step 161, then the flow proceeds to step 163 where the estimated vehicle velocity value Vn is calculated by the following equation:

$$Vn = \frac{VRRn + VRLn}{2} \times \alpha_2$$

The program then ends.

Referring back to step 156, it is decided there that the right-hand front-wheel slip flag SFFR is set to zero, then the flow advances to step 170 and it is further judged whether or not the left-hand front-wheel slip flag SFFL is set to zero. If it is judged at step 170 that the flag SFFL is set to zero, on the one hand, the flow advances to step 164 where the estimated vehicle velocity value Vn is calculated by the following equation:

$$Vn = \frac{VFRn + VFLn}{2} \times a_2$$

Then the program ends. If it is decided at step 170 that the flag SFFL is not zero, on the other, it is then judged at step 165 whether or not the left-hand rear-wheel slip flag SFRL is set to zero. At step 165, when it is decided that the flag SFRL is set to zero, on the one hand, the estimated vehicle velocity value Vn is calculated at step 166 by the following equation:

$$Vn = \frac{VFRn + VRLn}{2} \times a_2$$

The program then ends. If the decision at step 165 is made that the flag SFRL is not set to zero, on the other hand, it is further judged at step 167 whether the vehicle is cornering to the right or not. The estimated vehicle velocity value Vn is then calculated by the following equation:

$$Vn = VRRn \times a_2$$

at step 168 when it is judged at step 167 that the vehicle is not cornering to the right, on the one hand, and by the following equation:

$$Vn = VFRn \times a_2$$

at step 169 when it is judged there at that it is cornering to the right, on the other. In either case, the program ends after the calculation of the estimated vehicle velocity value.

At step 155, when it is decided that the slipping-wheel coefficient flag SF is not set to 2, then the flow proceeds to step 171 where it is further judged whether or not the flag SF is set to 3. When it is decided that the flag SF is set to 3, whether or not the right-hand rear-wheel sliP flag SFRR is set to zero is then judged at step 172. If it is decided there at that the flag SFRR is set to zero, then the flow proceeds to step 173 where the estimated vehicle velocity value Vn is calculated by the following equation:

$$Vn = VFRn \times a_3$$

Then the program ends. If it is decided at step 172 that the flag SFFR is not set to zero, it is then judged at step 174 as to whether or not the left-hand front-wheel slip flag SFFL is set to zero. If YES, then the estimated vehicle velocity value Vn is calculated at step 175 by the following equation:

$$Vn = VFLn \times a_3$$

The program then ends. If NO at step 174, then the flow proceeds to step 176 where it is further decided whether or not the right-hand rear-wheel slip flag SFRR is set to zero. If it is decided that the flag SFRR is set to zero, on the one hand, the estimated vehicle velocity value Vn is calculated at step 177 by the following equation:

$$Vn = VRRn \times a_3$$

while, if it is decided at step 176 that the flag SFRR is not set to zero, on the other, the estimated vehicle velocity value Vn is calculated at step 178 by the following equation:

$$Vn = FRLn \times a_3$$

In either case, the program then ends.

At step 171, it is decided that the slipping-wheel coefficient flag SF is not set to 3, then the program ends without any procedure.

b. Setting of Target Slip Ratio (Step P6 of FIG. 2; FIGS. 5A–5B)

As shown in FIG. 5A, the target slip ratios TGS of the wheels 20R, 20L, 21R and 21L are determined in the same manner in order of steps 180 to 183, inclusive.

Referring to FIG. 5B, at step 185, it is decided whether or not the actual slip ratio SR is greater than a predetermined reference value. It is to be noted herein that the reference value may be set in this embodiment to a value which can satisfy both the grip force and the transverse acceleration in more higher dimension—in other words, between the target slip ratios TARG·1 and TARG·0 as shown in FIG. 10. When it is decided at step 185 that the actual slip ratio SR is greater than the reference value, on the one hand, the target slip ratio TGS is set to the target slip ratio TGS·1. When it is decided at step 185 that the actual slip ratio SR is not greater than the reference value, on the other hand, the target slip ratio TGS is set to the target slip ratio TGS·0. Then, in each case, the flow is returned.

As will be understood from the process as shown in FIG. 5B, for the wheel that currently leaves a margin for the grip force, the target slip ratio is set in such a state that a rate of distributing torque can be increased. For the wheel that currently does not have a sufficient margin for the grip force, the target slip ratio is set in such a state that a rate of the torque distribution can be decreased.

c. Correction of Target Slip Ratio (Step P8 of FIG. 2; FIG. 6)

After the program was started at step P8 of FIG. 2, then at step 190, it is judged whether or not the current steering angle is increasing. When it is decided that the current steering angle is increasing, the target slip ratios for the left-hand front wheel 20L and for the right-hand front wheel 20R, TGS·FL and TGS·FR, respectively are set to TARG·1 at step 191. This is set to ensure a sufficient degree of transverse acceleration of the front wheels 20L and 20R because cornering maneuverability is strongly desired in the driving process in which the cornering radius gets smaller.

When it is decided at step 190 that the steering angle is not increasing, then it is judged at step 192 whether or not the steering angle is decreasing. When it is decided YES, then the flow advances to step 193 where the target slip ratios for the left-hand and right-hand rear wheels 21L and 21R, namely, TGS·RL and TGS·RR, are set to TARG·1, respectively. This stage means that the cornering is about to finish so that this setting is to ensure a sufficient degree of transverse acceleration of the rear wheels 21L and 21R in order to meet acceleration which follows. In other words, it is to ensure stability of the vehicle at the time when cornering has finished.

Figure 7A:
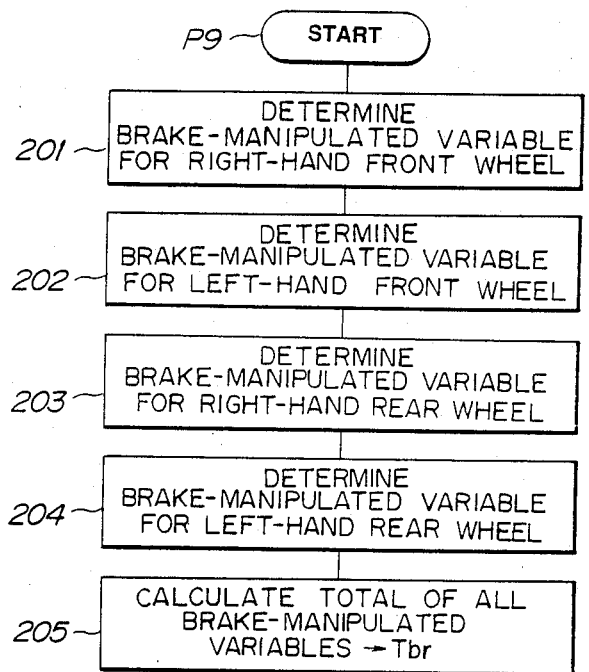
Figure 7B:
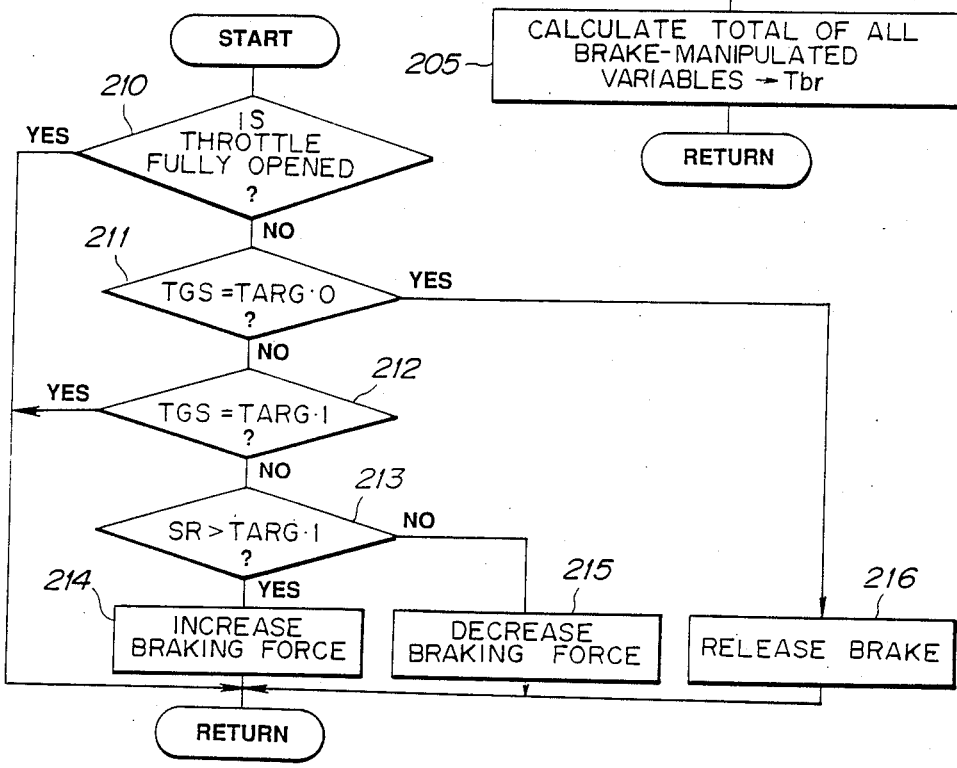

In instances where the steering angle is neither increasing nor decreasing, the target slip ratio is not changed as it was and the system is returned.

d. Brake Control (Step P9 of FIG. 2; FIGS. 7A–7B)

As shown in FIG. 7A, an amount, or a variable, of manipulating the brake for each of the wheels is determined in accordance with the processes 201 to 204. The procedure of determining the manipulated variable of the brake for each of the wheels is the same as each other in the manner as shown in FIG. 7B. Then at step 205, the sum of the braking force for all the wheels is calculated as a total decreased torque amount, Tbr. This total amount Tbr may be estimated on the basis of a period of time required for increasing or decreasing the pressure of the braking force or calculated from the braking pressure.

Referring to FIG. 7B, it is judged at step 210 whether or not the current throttle opening angle is full open. If it is decided that the current throttle opening angle is full open, the program ends as it is because the torque generated from the engine cannot be increased, as will be described hereinafter.

When it is decided at step 210 that the throttle valve is not full open, it is then judged at steps 211 and 212 whether or not the target slip ratio TGS is set to TARG·0 or TARG·1, respectively. If NO at both steps 211 and 212, the flow proceeds to step 213 and it is judged whether or not the current slip ratio SR is greater than the target slip ratio TARG·1. If YES, the braking force is increased at step 214 and, if NO, the braking force is decreased at step 215.

Figure 8A:
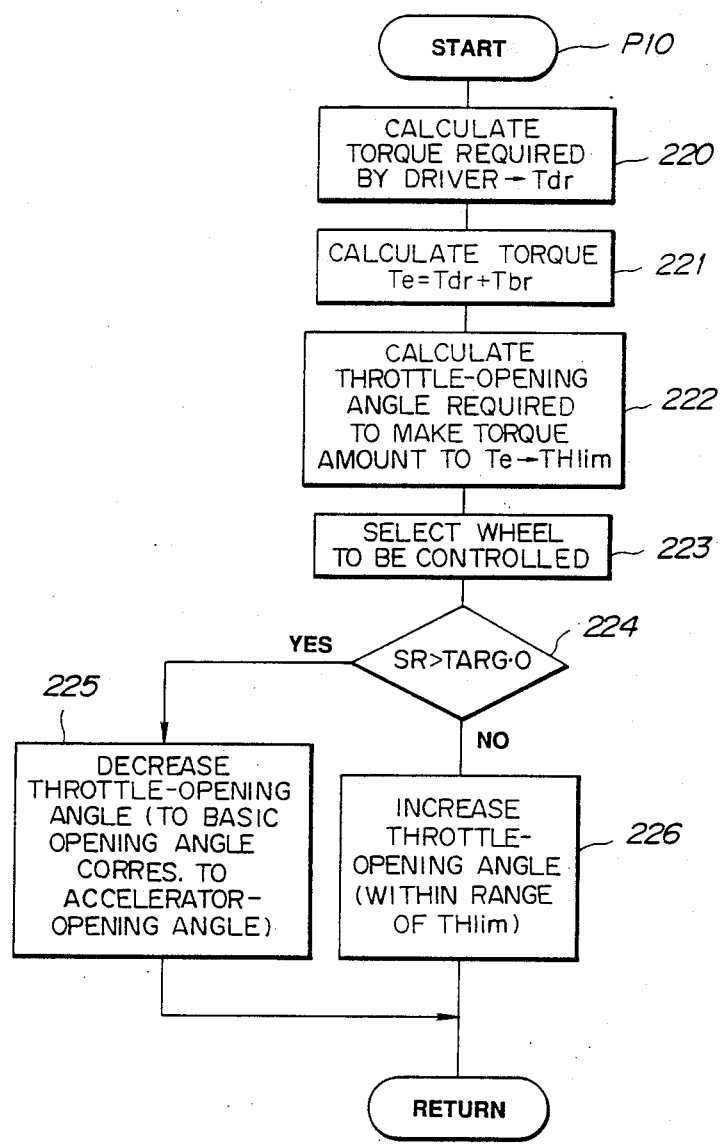
Figure 8B:
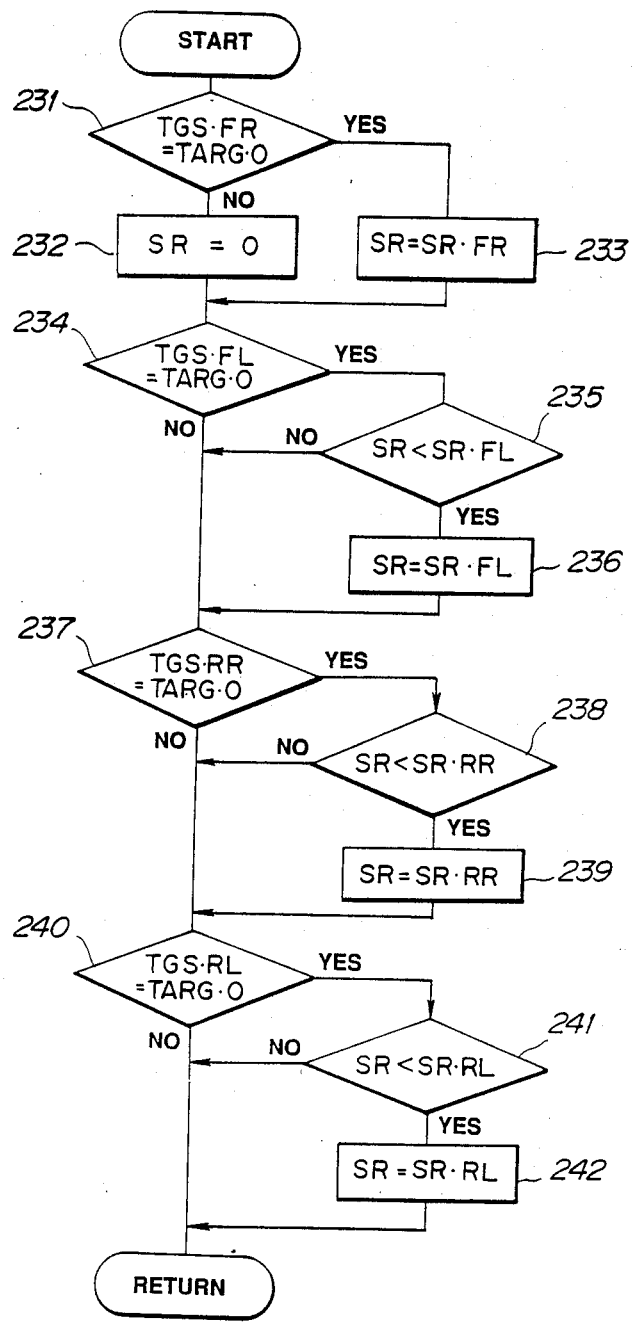

When it is decided at step 212 that the target slip ratio TGS is set to TARG·1, then the braking force is maintained as it was and the system is returned. It is noted that this contains the case where no braking force is applied. Further, at step 211, when it is decided that the target slip ratio TGS is set to TARG·0, the brake is released at step 216 in order to avoid application of an excessive pressure to the brake, and the program ends.

e. Engine Control (Step P10 of FIG. 2; FIGS. 8A–8B):

As shown in FIG. 8A, step 220 is to calculate the torque, Tdr, required currently by the driver. This torque Tdr can theoretically be given from the number of current revolutions of the engine and the throttle opening angle. Then at step 221, torque, Te, is calculated by adding the total amount of the braking force, Tbr, to the torque, Tdr. The torque Te is a magnitude of torque that can compensate the amount of torque decreased by braking, Tbr, and can allow the total amount of torque actually transmitted to all the wheels to amount to the torque Tdr required by the driver.

Figure 9:
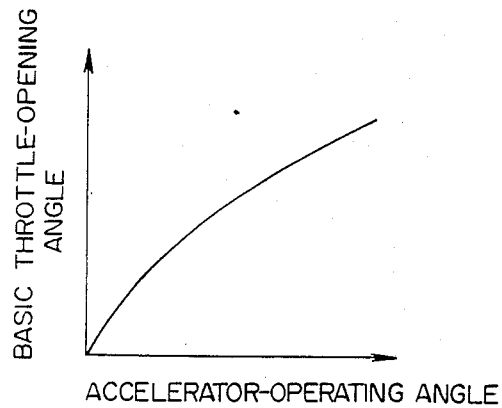
FIGS. 9 and 10 represents characteristics to be used for control in accordance with the present invention.

The flow then Proceeds to step 222 and the throttle opening angle THlim is calculated which is required for generating the torque Te. Thereafter, at step 223, the wheel that should be controlled is selected in a manner as will be described hereinafter with reference to FIG. 8B, in order to check whether or not it is slipping to an excessive degree to prevent an excessive slip of the wheel when the torque generated by the engine is increased. Then, in the process from steps 224 to 226, when the actual slip ratio SR of the wheel selected for the purpose of control is greater than the target slip ratio TARG·0, on the one hand, the throttle opening angle is decreased to a range in which it is not lowered than the basic throttle-opening angle corresponding to the accelerator-opening angle as shown in FIG. 9. When it is decided at step 224 that the actual slip ratio SR of the wheel concerned is not greater than the target slip ratio TARG·0, on the other hand, the throttle opening angle is increased within the range of the throttle opening angle THlim decided at step 222.

The selection of the wheel for the purpose of control at step 223 of FIG. 8A is implemented in accordance with the flow chart of FIG. 8B. Briefly speaking, as shown at steps 224 to 226 of FIG. 8B, it is required that the wheel does not exceed the target slip ratio TARG·0 so that the wheel to be selected for the purpose of control should be set so as to have the target slip ratio TARG·0. It is further noted that, in instances here plural wheels have the target slip ratio TARG·0, the wheel to be selected for the purpose of control is the one that has the largest actual slip ratio SR.

Given the foregoing, at step 231, it is judged whether or not the target slip ratio TGS·FR for the right-hand front wheel 20R is set to TARG·0. When the decision at step 231 is NO, on the one hand, then the flow proceeds to step 232 where the slip ratio SR of the wheel selected for the purpose of control is set to zero. When it is decided at step 231 that the target slip ratio TGS·FR is the target slip ratio TARG·0, on the other, the actual slip ratio SR is selected at slip 233 as an actual slip ratio for the right-hand front wheel, SR·FR.

After steps 232 or 233, it is judged at step 234 whether or not the target slip ratio for the left-hand front wheel 20L, TGS.FL, is set to the target slip ratio TARG·0. If it is decided at step 234 that the target slip ratio TGS·FL is not set to TARG·0, on the one hand, the flow then proceeds to step 237 and it is judged whether or not the target slip ratio of the right-hand rear wheel 21R, TGS·RR, is set to the target slip ratio TARG·0. If the decision at step 234 is YES, on the other hand, it is then judged at step 235 whether or not the actual slip ratio SR (equal to the actual slip ratio at steps 232 and 233) is smaller than the actual slip ratio for the left-hand front wheel 20L, SR·FL. When it is decided at step 235 that the actual slip ratio SR is not smaller than SR·FL, on the one hand, then the flow advances to step 237. When it is decided at step 235 that the actual slip ratio SR is smaller than SR·FL, on the other, the actual slip ratio SR is selected for the actual slip ratio for the left-hand front wheel 20L, SR·FL, at step 236 and the flow then advances to step 237.

The target slip ratio for the right-hand rear wheel 21R, TGS·RR, is decided in substantially the same manner as described hereinabove at the process from step 237 to 239. Further, at the process from step 240 to 242, the target slip ratio for the left-hand rear wheel 21L, TGS·RL, is decided in substantially the same manner as described hereinabove. At the stage when the process of FIG. 8B has finished, the wheel which has the greatest actual slip ratio is selected from the wheels having the target slip ratio of TARG·0 and it is determined for the purpose of control. If all the wheels have the target slip ratio TARG·1, the slip ratio SR (=0) decided at step 232 is used for the decision at step 224 of FIG. 8A.

It is to be understood that the foregoing text and drawings relate to embodiments of the present invention given by way of examples but not limitation. Various other embodiments and variants are possible within the spirit and scope of the present invention.

What is claimed is:

1. A torque distribution control system for a four wheel drive vehicle comprising:
   a brake means disposed at each of four wheels independently and separately from each other;
   a braking pressure adjusting means disposed at each of two groups of the wheels;
   a slip value detecting means for detecting a slip value of each wheel with respect to pavement;
   a slipping-wheel judging means for judging a slipping wheel which slips in an actual slip value greater than a given target slip value by comparing the actual slip value detected by said slip value detecting means with the target slip value;
   a brake control means for operating said brake means against the group of the wheels containing the slipping wheel when the slipping wheel detected by said slipping-wheel judging means is contained only one of the two groups of the wheels; and
   an engine control means for operating an engine to increase its output torque in accordance with operation of said brake means when said brake control means is operated.

2. A torque distribution control system as claimed in claim 1, wherein the output torque of the engine is increased in such a manner that all drive torque for the four wheels amounts to torque required by an operator.

3. A torque distribution control system as claimed in claim 1, wherein the output torque of the engine is increased by an amount that compensates a loss of torque caused by operation of said brake means.

4. A torque distribution control system as claimed in claim 2, wherein the torque required by the operator is given from the number of current revolutions of the engine and a throttle opening angle.

5. A torque distribution control system as claimed in claim 1, wherein said target slip value is altered to a different value corresponding to a driving state of a vehicle.

6. A torque distribution control system as claimed in claim 1, wherein said slip value is given from a vehicle velocity and a peripheral velocity of each of the wheels.

7. A torque distribution control system as claimed in claim 6, wherein said vehicle velocity is given from a mean value of peripheral velocities of the wheels which cause no slipping.

8. A torque distribution control system for a four wheel drive vehicle comprising:
   a brake means disposed at each of the four wheels independently and separately from each other;
   a braking pressure adjusting means disposed at each of the four wheels;
   a slip value detecting means for detecting a slip value of each wheel with respect to pavement;
   a slipping-wheel judging means for judging a slipping wheel which slips in an actual slip value greater than a given target slip value by comparing the actual slip value detected by said slip value detecting means with the target slip value;
   a brake control means for operating said brake means against the slipping wheel detected by said slipping-wheel judging means; and
   an engine control means for operating an engine to increase its output torque in accordance with operation of said brake means when said brake control means is operated.

9. A torque distribution control system as claimed in claim 8, wherein the output torque of the engine is increased by an amount that compensates a loss of torque caused by operation of said brake means.

10. A torque distribution control system as claimed in claim 8, wherein the output torque of the engine is increased in such a manner that all drive torque for the four wheels amounts to torque required by an operator.

11. A torque distribution control system as claimed in claim 10, wherein the torque required by the operator is given from the number of current revolutions of the engine and a throttle opening angle.

12. A torque distribution control system as claimed in claim 8, wherein said target slip value is altered to a different value corresponding to a driving state of a vehicle.

13. A torque distribution control system as claimed in claim 12, wherein said slip value is given from a vehicle velocity and a peripheral velocity of each of the wheels.

14. A torque distribution control system as claimed in claim 13, wherein said vehicle velocity is given from a mean value of peripheral velocities of the wheels which cause no slipping.

15. A torque distribution control system as claimed in claim 14, wherein the output torque of the engine is increased by an amount that compensates a loss of torque caused by operation of said brake means.

16. A torque distribution control system as claimed in claim 15, wherein the output torque of the engine is increased in such a manner that all drive torque for the four wheels amounts to torque required by an operator.

17. A torque distribution control system as claimed in claim 16, wherein the torque required by the operator is given from the number of current revolutions of the engine and a throttle opening angle.

18. A torque distribution control system as claimed in claim 17, wherein said target slip value is altered to a different value corresponding to a driving state of a vehicle.

19. A torque distribution control system as claimed in claim 18, further comprising:
   a front differential gear interposed between right-hand and left-hand front wheels;
   a rear differential gear interposed between right-hand and left-hand rear wheels; and
   a center differential gear interposed between front and rear wheels.

* * * * *